United States Patent
Cho et al.

(10) Patent No.: US 12,085,329 B2
(45) Date of Patent: Sep. 10, 2024

(54) REFRIGERATOR AND CONTROLLING METHOD THEREOF

(71) Applicant: Samsung Electronics Co., Ltd., Suwon-si (KR)

(72) Inventors: Sungho Cho, Suwon-si (KR); Seungwan Kang, Suwon-si (KR); Kyungtae Ko, Suwon-si (KR); Jiwon Chung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 141 days.

(21) Appl. No.: 17/327,089

(22) Filed: May 21, 2021

(65) Prior Publication Data
US 2021/0396454 A1   Dec. 23, 2021

(30) Foreign Application Priority Data

Jun. 19, 2020   (KR) ........................ 10-2020-0075071

(51) Int. Cl.
*F25D 23/02* (2006.01)
*F25D 11/02* (2006.01)
(Continued)

(52) U.S. Cl.
CPC ............ *F25D 23/028* (2013.01); *F25D 11/02* (2013.01); *F25D 29/003* (2013.01);
(Continued)

(58) Field of Classification Search
CPC ...... F25D 23/028; F25D 11/02; F25D 29/003; F25D 2323/02; F25D 2700/04; G10L 15/22; G10L 2015/223
See application file for complete search history.

(56) References Cited

U.S. PATENT DOCUMENTS

| 10,436,498 B2 | 10/2019 | Lim et al. |
| 2011/0023511 A1 | 2/2011 | Lee et al. |

(Continued)

FOREIGN PATENT DOCUMENTS

| CN | 201964716 U | * | 9/2011 |
| CN | 105318652 A |   | 2/2016 |

(Continued)

OTHER PUBLICATIONS

Translated_Kim (Year: 2017).*

(Continued)

*Primary Examiner* — Elizabeth J Martin
*Assistant Examiner* — Samba N Gaye
(74) *Attorney, Agent, or Firm* — Jefferson IP Law, LLP

(57) ABSTRACT

A refrigerator is provided. The refrigerator includes a main body including a door, a door opening device including a motor, and for opening the door using the motor, a proximity sensor, and a controller, wherein the controller is configured to detect whether an object exists within a first distance from a predetermined area of the refrigerator, identify whether the object is detected during a threshold time range, based on the object being detected during the threshold time range, identify whether the object is detected outside a second distance from the predetermined area, and based on the object being detected outside the second distance, control the motor to open the door.

14 Claims, 14 Drawing Sheets

(51) Int. Cl.
  *F25D 29/00* (2006.01)
  *G10L 15/22* (2006.01)
(52) U.S. Cl.
  CPC ...... *F25D 2323/02* (2013.01); *F25D 2700/04* (2013.01); *G10L 15/22* (2013.01); *G10L 2015/223* (2013.01)

(56) References Cited

U.S. PATENT DOCUMENTS

| | | | |
|---|---|---|---|
| 2011/0095670 | A1 | 4/2011 | Cho et al. |
| 2019/0330909 | A1* | 10/2019 | Lee .................. E05F 15/79 |
| 2020/0003482 | A1* | 1/2020 | Kim .................. G06V 10/811 |
| 2021/0277705 | A1 | 9/2021 | Chang et al. |

FOREIGN PATENT DOCUMENTS

| | | | | |
|---|---|---|---|---|
| CN | 105737506 | A | * | 7/2016 |
| CN | 110017651 | A | * | 7/2019 |
| CN | 110411111 | A | * | 11/2019 |
| CN | 111238140 | A | | 6/2020 |
| JP | 2004-108604 | A | | 4/2004 |
| JP | 2017-069835 | A | | 4/2017 |
| KR | 10-2012-0134443 | A | | 12/2012 |
| KR | 10-1480459 | B1 | | 1/2015 |
| KR | 10-1580447 | B1 | | 12/2015 |
| KR | 10-2017-0028238 | A | | 3/2017 |
| KR | 10-2017-0054741 | A | | 5/2017 |
| KR | 10-2017-0082009 | A | | 7/2017 |
| KR | 20170082009 | A1 | * | 7/2017 |
| KR | 10-1797105 | B1 | | 11/2017 |
| KR | 10-2018-0049703 | A | | 5/2018 |
| KR | 10-1893132 | B1 | | 8/2018 |
| KR | 10-2001870 | B1 | | 7/2019 |
| WO | WO-2016107686 | A1 | * | 7/2016 ........... F25D 27/005 |

OTHER PUBLICATIONS

Translated_He (Year: 2011).*
Translated_Dai (Year: 2016).*
Translated_Zihao (Year: 2019).*
Translated_Xue (Year: 2019).*
International Search Report dated Aug. 19, 2021, issued in International Application No. PCT/KR2021/005016.

* cited by examiner

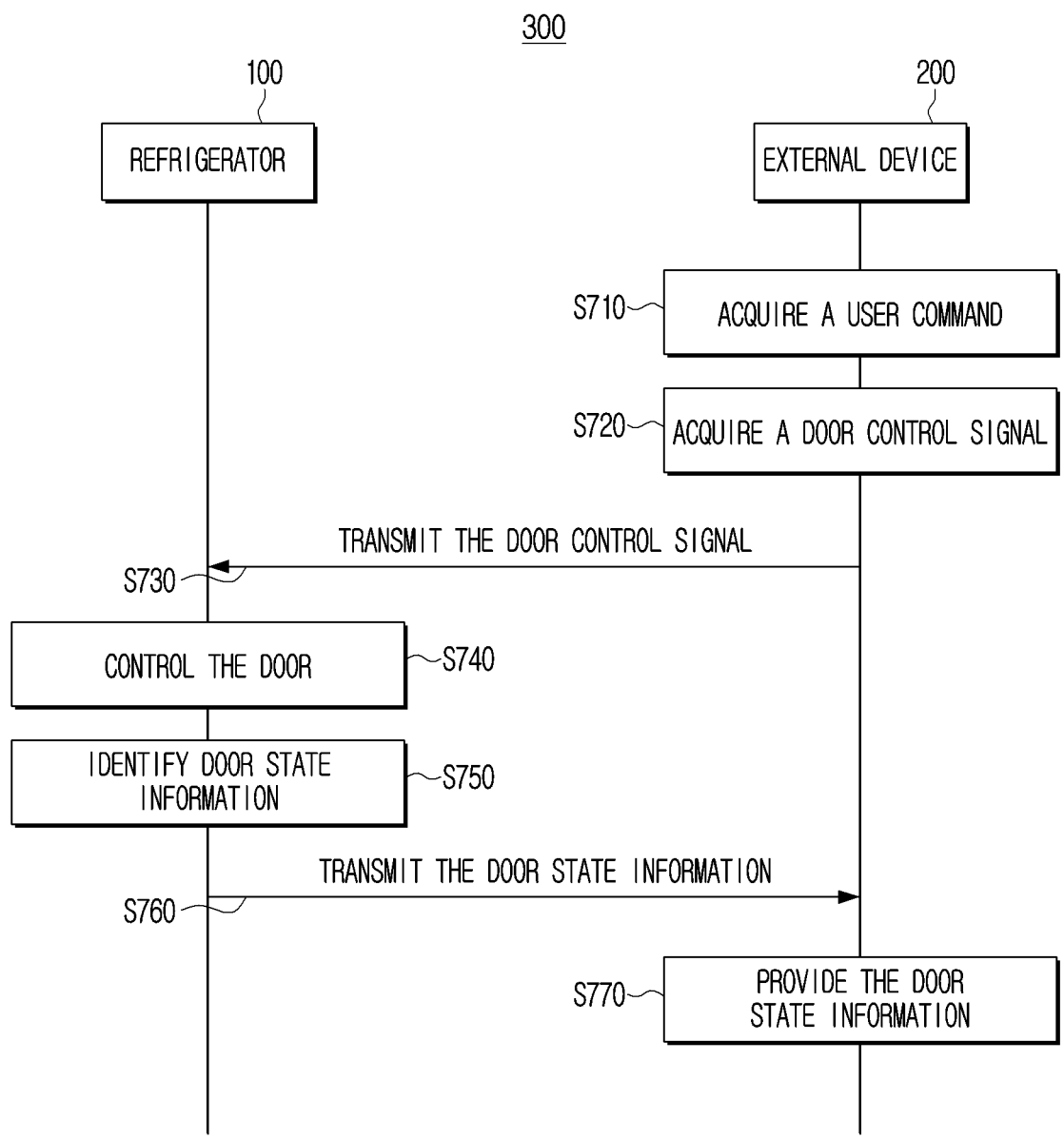

REFRIGERATOR AND CONTROLLING METHOD THEREOF

CROSS-REFERENCE TO RELATED APPLICATION(S)

This application is based on and claims priority under 35 U.S.C. § 119(a) of a Korean patent application number 10-2020-0075071, filed on Jun. 19, 2020, in the Korean Intellectual Property Office, the disclosure of which is incorporated by reference herein in its entirety.

BACKGROUND

1. Field

The disclosure relates to a refrigerator and a controlling method thereof. More particularly, the disclosure relates to a refrigerator that automatically opens the door, and a controlling method thereof.

2. Description of Related Art

Spurred by the development of electronic technologies, user needs for a refrigerator that automatically opens and closes the refrigerator door are increasing recently. For example, in a situation wherein a user is holding a heavy dish on both hands and cannot open a door directly, there may be a desperate need for an automatic opening function of a door.

Meanwhile, for automatically opening and closing a door as above, there is a need that an appropriate trigger operation for identifying a user's intention of opening and closing the door is set. Accordingly, there is a rising need for a technology of setting an appropriate trigger operation that can prevent a malfunction and improve user convenience.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a refrigerator that opens the door based on a trigger operation that can improve user convenience.

Additional aspects will be set forth in part in the description which follows and, in part, will be apparent from the description, or may be learned by practice of the presented embodiments.

In accordance with an aspect of the disclosure, a refrigerator is provided. The refrigerator includes a main body including a door, a door opening device including a motor, and for opening the door through rotation of the motor, a proximity sensor, and a controller, wherein the controller is configured to detect whether an object exists within a first distance from a predetermined area of the refrigerator, identify whether the object is detected during a threshold time range, based on the object being detected during the threshold time range, identify whether the object is detected outside a second distance from the predetermined area, and based on the object being detected outside the second distance, control the motor to open the door.

The controller may identify whether the object is detected outside the second distance within a predetermined time from the time point when the object is not detected within the first distance any longer after being detected within the first distance, and based on the object being detected outside the second distance within the predetermined time, control the motor to open the door.

The predetermined area may be an upper area of a lower door of the refrigerator.

In accordance with another aspect of the disclosure, a refrigerator is provided. The refrigerator includes a light emitting part, and the controller may, based on the object being detected during the threshold time range, control the light emitting part to operate in a first light emitting mode, and based on the object being detected outside the second distance, control the light emitting part to operate in a second light emitting mode different from the first light emitting mode.

The controller may, based on the object not being detected during the threshold time range within the first distance, control the light emitting part to operate in a third light emitting mode.

When the object is detected outside the second distance, based on detecting that the object is located within a threshold distance from the predetermined area, the controller may not open the door.

In accordance with another aspect of the disclosure, a proximity sensor is provided. The proximity sensor includes a first sensor configured to detect whether the object exists within the first distance and whether the object is located outside the second distance from the predetermined area, and a second sensor configured to detect whether the object exists within a threshold distance.

In accordance with another aspect of the disclosure, a door is provided. The door includes a first door and a second door arranged in the lower part of the first door, and the first sensor may be arranged in the upper part of the second door, and the second sensor may be arranged in the lower part of the second door.

In accordance with another aspect of the disclosure, a refrigerator is provided. The refrigerator includes a main body including a door, a door opening device including a motor, and for opening the door through rotation of the motor, a proximity sensor, a speaker for providing a voice guide, and a controller, wherein the controller is configured to, based on acquiring a voice command of a user for opening the door, identify whether the user exists within a predetermined distance range from the predetermined area by using the proximity sensor, based on identifying that the user exists within the predetermined distance range, control the motor to open the door, and based on identifying that the user does not exist within the predetermined distance range, control the speaker to output a guide message for guiding the user.

In accordance with another aspect of the disclosure, a controlling method of a refrigerator is provided. The method includes a main body including a door, a door opening device including a motor, and for opening the door through rotation of the motor, a proximity sensor, and a controller, wherein the method includes the operations of detecting whether an object exists within a first distance from a predetermined area of the refrigerator, identifying whether the object is detected during a threshold time range, based on the object being detected during the threshold time range, identifying whether the object is detected outside a second distance from the predetermined area, and based on the object being detected outside the second distance, controlling the motor to open the door.

In accordance with another aspect of the disclosure, a controlling method of a refrigerator is provided. The method includes a main body including a door, a door opening device including a motor, and for opening the door through rotation of the motor, a proximity sensor, a speaker for providing a voice guide, and a controller, wherein the method includes the operations of, based on acquiring a voice command of a user for opening the door, identifying whether the user exists within a predetermined distance range from the predetermined area by using the proximity sensor, based on identifying that the user exists within the predetermined distance range, controlling the motor to open the door, and based on identifying that the user does not exist within the predetermined distance range, controlling the speaker to output a guide message for guiding the user.

Meanwhile, the means for resolving the task of the disclosure are not limited to the aforementioned means for resolution, and means for resolution that were not mentioned would be clearly understood by a person having ordinary skill in the technical field to which the disclosure pertains from this specification and the accompanying drawings.

According to the various embodiments of the disclosure as above, an appropriate guide is provided to a user based on a detection result of a proximity sensor, and thus a door can be opened without a malfunction. Accordingly, user convenience and satisfaction can be improved.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 7 is a sequence diagram of a refrigerator control system according to an embodiment of the disclosure.

Throughout the drawings, like reference numerals will be understood to refer to like parts, components, and structures.

DETAILED DESCRIPTION

Figure 1A:
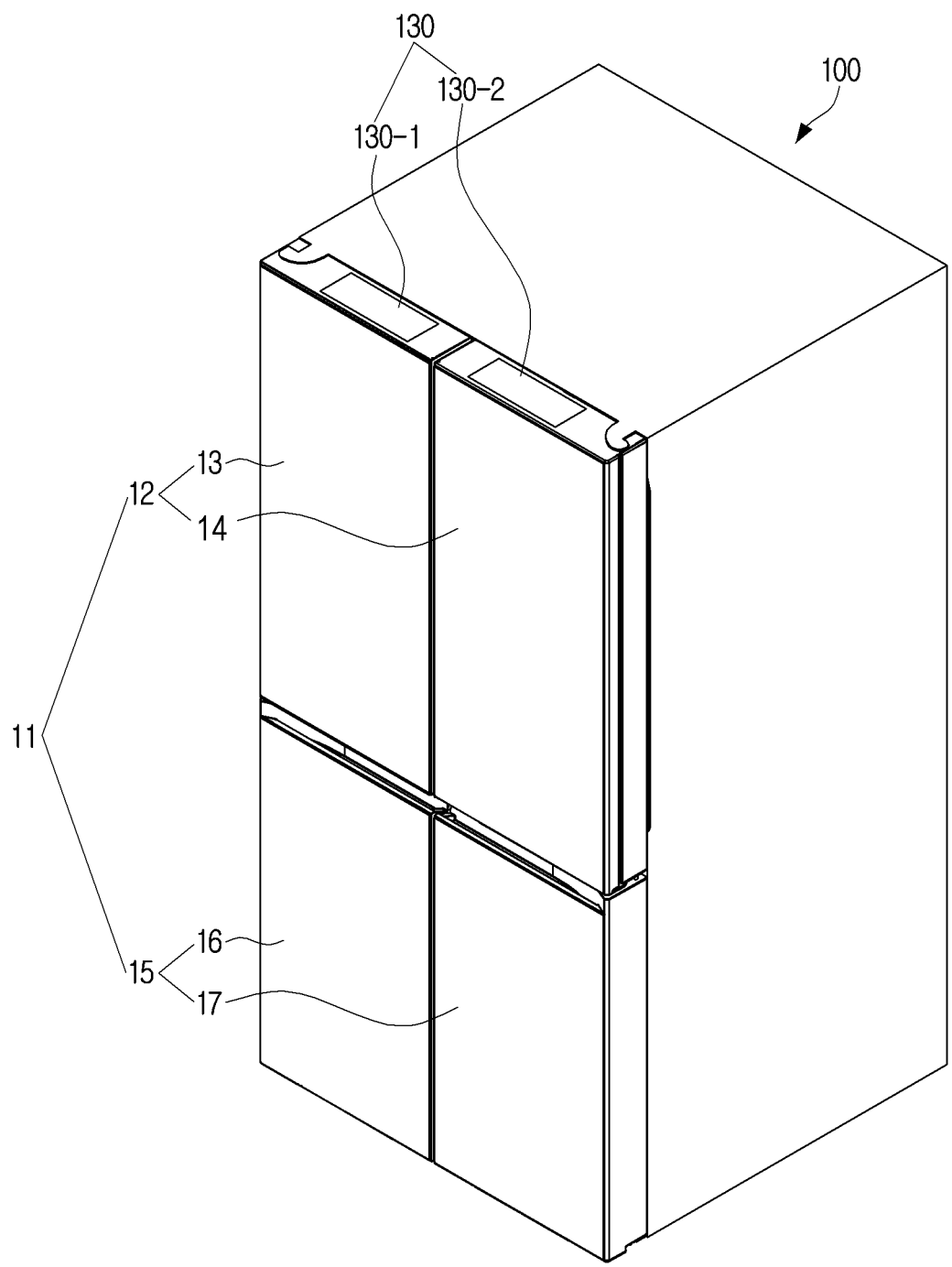
FIG. 1A is a perspective view of a refrigerator according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In addition, various modifications may be made to the embodiments of the disclosure, and there may be various types of embodiments. Accordingly, specific embodiments will be illustrated in drawings, and the embodiments will be described in the detailed description. However, it should be noted that the various embodiments are not for limiting the scope of the disclosure to a specific embodiment of the disclosure, but they should be interpreted to include all modifications, equivalents or alternatives of the embodiments included in the ideas and the technical scopes disclosed herein. Meanwhile, in case it is determined that in describing embodiments of the disclosure, detailed explanation of related known technologies may unnecessarily confuse the gist of the disclosure, the detailed explanation will be omitted.

In addition, terms, such as "first," "second" and the like may be used to describe various elements, but the elements should not be limited by the terms. Such terms are used only for the purpose of distinguishing one element from another element.

Further, singular expressions include plural expressions, unless defined obviously differently in the context. In addition, in the disclosure, terms, such as "include" and "consist of" should be construed as designating that there are such characteristics, numbers, operations, elements, components or a combination thereof described in the specification, but not as excluding in advance the existence or possibility of adding one or more of other characteristics, numbers, operations, elements, components or a combination thereof.

Hereinafter, embodiments of the disclosure will be described with reference to the accompanying drawings, to the extent that those having ordinary skill in the art to which the disclosure belongs can easily carry out the embodiments. However, it should be noted that the disclosure may be implemented in various different forms, and is not limited to the embodiments described herein. In addition, in the drawings, parts that are not related to explanation were omitted, for explaining the disclosure clearly, and throughout the specification, similar components were designated by similar reference numerals.

FIG. 1A is a perspective view of a refrigerator according to an embodiment of the disclosure.

Figure 1B:
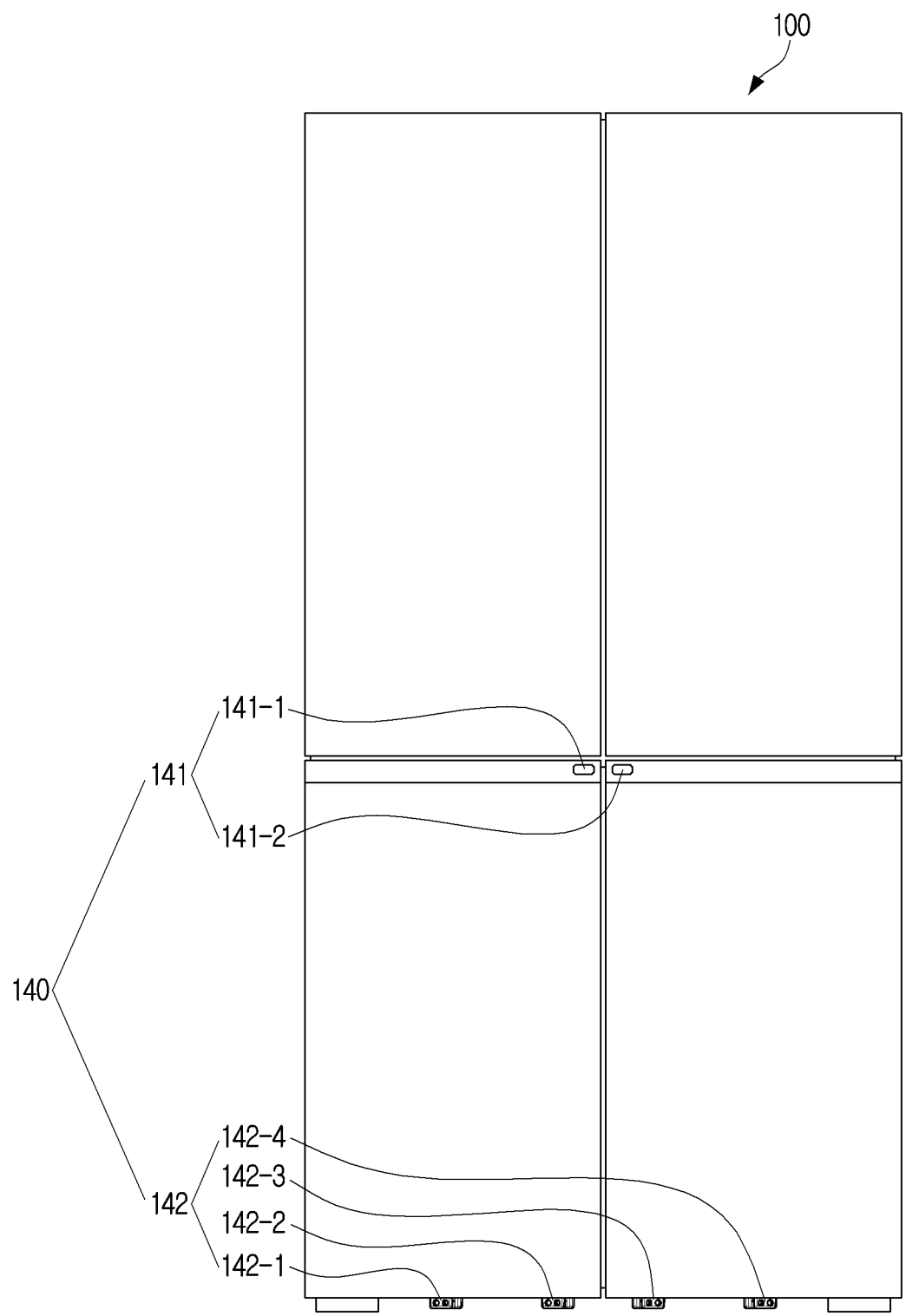
FIG. 1B is a front view of a refrigerator according to an embodiment of the disclosure.

FIG. 1B is a front view of a refrigerator according to an embodiment of the disclosure.

Referring to FIG. 1A, an electronic device (e.g., a refrigerator 100) may include a plurality of doors 11 and a door opening device 130.

The door 11 includes a refrigerating chamber door 12 and a freezing chamber door 15. The refrigerating chamber door 12 may include a first refrigerating chamber door 13 and a second refrigerating chamber door 14. In addition, the freezing chamber door 15 may include a first freezing chamber door 16 and a second freezing chamber door 17. Meanwhile, in the disclosure, a T-type refrigerator including four doors is described as an example, but the idea for opening of the door 11 that will be described below can obviously be applied to various refrigerators without a limitation on the types of refrigerators.

The door opening device 130 may open the door 11.

The door opening device 130 may be arranged on a door that needs to be opened. As an example, as illustrated in FIG. 1A, the door opening device 130 may be provided on the plurality of respective refrigerating chamber doors 12 for opening of the plurality of respective refrigerating chamber doors 12. For example, a first door opening device 130-1 may be arranged in the upper part of the first refrigerating chamber door 13, and a second door opening device 130-2 may be arranged in the upper part of the second refrigerating chamber door 14. However, the disclosure is not limited thereto, and in case one refrigerating chamber door 12 includes a plurality of doors, the door opening device 130 may be provided on one or all of the plurality of doors. Alternatively, it is possible that the door opening device 130 is provided on the freezing chamber door 15 for opening the freezing chamber door 15. The door opening device 130 may include a motor, a lever, a clutch, and a plurality of gears.

Referring to FIG. 1B, the refrigerator 100 may include an object detection part 140 and a light emitting part 150.

The object detection part 140 is a component for detecting an object (or a user) that exists within a predetermined range from the refrigerator 100, and it may include a plurality of proximity sensors 141, 142. Here, the first sensor 141 may include a 1-1 sensor (141-1) and a 1-2 sensor (141-2), and the second sensor 142 may include a 2-1 sensor (142-1), a 2-2 sensor (142-2), a 2-3 sensor (142-3), and a 2-4 sensor (142-4). The object detection part 140 may be implemented as an infrared rays (IR) sensor or an ultrasonic sensor. Meanwhile, it is defined that in the disclosure, the feature of detecting a user includes not only a case of detecting a user's body but also a case of detecting an object that a user is holding.

The first sensor 141 may be arranged in the upper part of the freezing chamber door 15. However, this is merely an embodiment of the disclosure, and the first sensor 141 may be arranged on the frame of the refrigerator 100 located between the refrigerating chamber door 12 and the freezing chamber door 15. The second sensor 142 may be arranged in the lower part of the freezing chamber door 15. Specifically, the second sensor 142 may be attached on the lower surface of the freezing chamber door 15. Accordingly, the first sensor 141 and the second sensor 142 may easily detect an object around the refrigerator 100.

Meanwhile, the respective sensing areas of the first sensor 141 and the second sensor 142 may be different from each other. For example, the first sensor 141 may detect whether a user exists within 30 cm from the refrigerator 100, and the second sensor 142 may detect whether a user exists within 60 cm from the refrigerator 100.

The light emitting part 150 is a component for providing a visual effect or a guide light to a user, and it may include at least one light output diode. For example, the light emitting part 150 may include a light emitting diode (LED). Meanwhile, the light emitting part 150 may operate in various types of light emitting modes, and output lights having various shapes or patterns. For example, the light emitting part 150 may operate in a first light emitting mode (e.g., a flicker). In addition, the light emitting part 150 may operate in a second light emitting mode (e.g., the flickering speed increases). Other than the above, the light emitting part 150 may operate in various light emitting modes.

The light emitting part 150 may be arranged in various locations. For example, the light emitting part 150 may be arranged in the lower part of the refrigerating chamber door 12. In addition, the light emitting part 150 may include a first light emitting part and a second light emitting part. Here, the first light emitting part may be arranged in the lower part of the first refrigerating chamber door 13, and the second light emitting part may be arranged in the lower part of the second refrigerating chamber door 14. However, this is merely an embodiment of the disclosure, and it is possible that the light emitting part 150 is arranged on the freezing chamber door 15.

Figure 2:
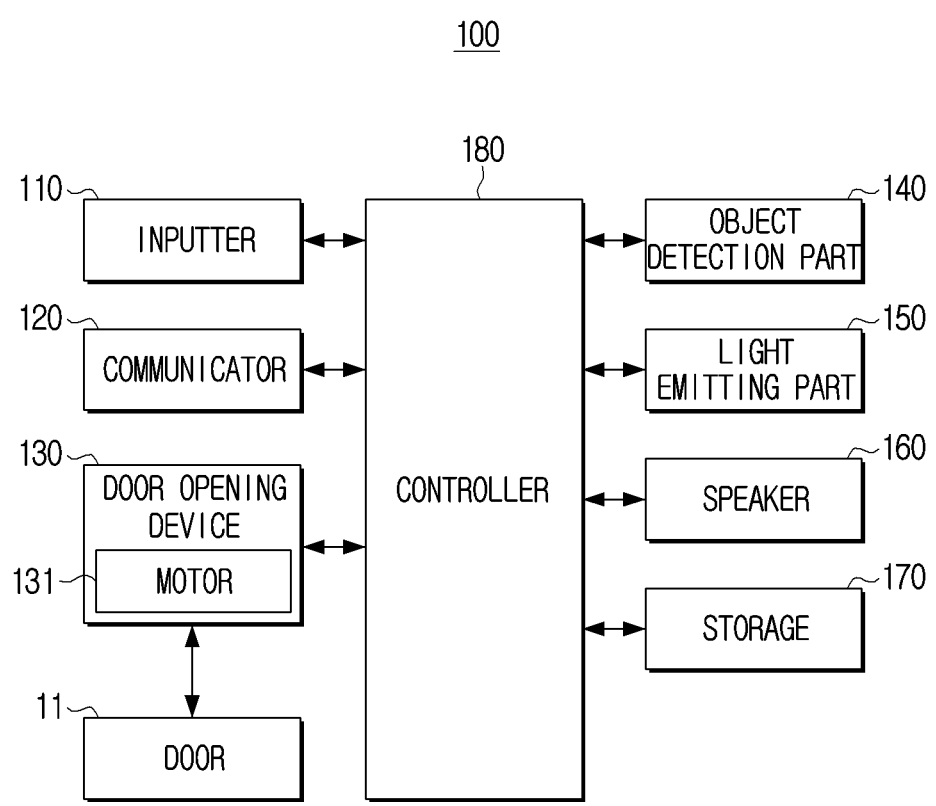
FIG. 2 is a block diagram illustrating a refrigerator according to an embodiment of the disclosure.

FIG. 2 is a block diagram illustrating a refrigerator according to an embodiment of the disclosure.

Referring to FIG. 2, the refrigerator 100 may include an inputter 110, a communicator 120, a door opening device 130, an object detection part 140, a light emitting part 150, and a speaker 160. Hereinafter, individual components of the refrigerator 100 will be described.

The inputter 110 is a component for acquiring a user command for opening the door 11. For example, the inputter 110 may be implemented as a microphone acquiring a user's voice command, a switch that is turned on by a user's contact, a touch screen that acquires a user's touch input, or a sensor that detects a user's gesture, but is not limited thereto.

The communicator 120 includes at least one circuit, and may communicate with various types of external devices. The communicator 120 may include a wireless communication module. For example, the communicator 120 may include at least one of a Wireless-Fidelity (Wi-Fi) module, a Bluetooth communication module, a cellular communication module, a $4^{th}$ Generation (4G) Long Term Evolution (LTE) communication module, or a $5^{th}$ Generation (5G) communication module. The communicator 120 may receive a user command for opening the door 11 that is transmitted from a user terminal device. In addition, when a user voice command is acquired through the inputter 110, the communicator 120 may transmit the acquired voice command to an external server. Here, the controller 180 may receive a signal for performing an operation corresponding to the user voice command from the external server, and control the door opening device 130 based on the received signal. However, this is merely an embodiment of the disclosure, and the controller 180 may analyze a user voice command acquired through the inputter 110, and control the door opening device 130 based on the analysis result.

The door opening device 130 is a component for opening the door 11 as described earlier in FIG. 1A, and it may include a motor 131 for providing a rotational force. In addition, the door opening device 130 may include a power supply part (e.g., a battery) for providing power of the motor 131.

The object detection part 140 may acquire distance information for an object that exists around the refrigerator 100. The controller 180 may control the respective components of the refrigerator 100 based on distance information for an object acquired through the object detection part 140. As an example, if a user is detected within a threshold distance (e.g., 30 cm) from the refrigerator 100 while the door 11 is opened, the controller 180 may stop the rotating motor 131. Alternatively, the controller 180 may control the light emitting part 150 to operate in a specific light emitting mode based on a distance where a user is detected.

The light emitting part 150 is a component for providing a visual effect or a guide light to a user, and it may operate in various light emitting modes based on a distance between the refrigerator 100 and a user, and output various types of lights. For example, if a user is detected during a threshold time range within 10 cm from the refrigerator 100, the light emitting part 150 may operate in the first light emitting mode (e.g., a flicker). In addition, if a user is detected outside 20 cm from the refrigerator 100 while the light emitting part 150 operates in the first light emitting mode, the light emitting part 150 may operate in the second light emitting mode (e.g., the flickering speed increases).

The speaker 160 is a component for providing a voice guide to a user. For example, the speaker 160 may output a voice guide for indicating the state of the refrigerator 100. Specifically, the speaker 160 may output a voice guide indicating that the refrigerator 100 detected a user. Alternatively, the speaker 160 may output a voice guide indicating a state wherein the refrigerator 100 can receive a trigger operation or a voice. In addition, the speaker 160 may output a guide message corresponding to a user's voice command.

The storage 170 may store a command or data related to at least one other component of the refrigerator 100. More particularly, the storage 170 may include a non-volatile memory and a volatile memory, and for example, it may be implemented as a flash-memory, a hard disc drive (HDD), or a solid state drive (SSD), or the like. The storage 170 may be accessed by the controller 180, and reading/recording/correction/deletion/update, or the like, of data by the controller 180 may be performed. In addition, the storage 170 may store an artificial intelligence agent for operating a conversation system. Specifically, the refrigerator 100 may use an artificial intelligence agent for generating a natural language as a response to a user utterance or acquiring a control command Here, the artificial intelligence agent is a dedicated program for providing artificial intelligence (AI)-based services (e.g., a speech recognition service, an agent service, a translation service, a search service, or the like). More particularly, the artificial intelligence agent may be executed by a generic-purpose processor of the related art (e.g., a CPU) or a separate AI-dedicated processor (e.g., a GPU, an NPU, or the like). In addition, the storage 170 may include a speech input module, a speech recognition (SR) module, a natural language understanding (NLU) module, a dialogue manager (DM) module, a natural language generator (NLG) module, a text to speech (TTS) module, and an output module.

The controller 180 may control the overall operations of the refrigerator 100. More particularly, the controller 180 may control the operation of the door opening device 130 based on a user's location or gesture detected through the object detection part 140. Hereinafter, an operation of the controller 180 will be described.

The controller 180 may detect whether an object (e.g., an object held in a user's hand) exists within the first distance (e.g., 10 cm) from a predetermined area R of the refrigerator 100. Here, the predetermined area R may be the upper area of the freezing chamber door 15. If an object is detected within the first distance, the controller 180 may identify whether the object is detected during a threshold time range (e.g., two seconds). If the object is detected during the threshold time range, the controller 180 may control the light emitting part 150 to operate in the 1-1 light emitting mode, and control the speaker 160 to output the 1-1 voice guide. Accordingly, the user may recognize that it is a state wherein the controller 180 receives a trigger operation. In contrast, if the object is not detected during the threshold time range, the controller 180 may control the light emitting part 150 to operate in the 1-2 light emitting mode, and control the speaker 160 to output the 1-2 voice guide. Meanwhile, here, the value of the threshold time may be changed according to the user's manipulation.

Then, the controller 180 may identify whether an object is detected outside the second distance (e.g., 20 cm) from the predetermined area R. Specifically, the controller 180 may identify whether an object is detected outside the second distance within a predetermined time (e.g., three seconds) from the time point when the object is not detected within the first distance any longer after being detected within the first distance. Here, the value of the predetermined time may be changed according to the user's manipulation.

If it is identified that an object is detected outside the second distance within the predetermined time, the controller 180 may control the motor 131 to open the door 11. Along with this, the controller 180 may control the light emitting part 150 to operate in the 2-1 light emitting mode, and control the speaker 160 to output the 2-1 voice guide. Here, the 2-1 voice guide may include a voice message notifying opening of the door 11. In contrast, if it is not identified that an object is detected outside the second distance within the predetermined time, the controller 180 may not open the door 11, and control the light emitting part 150 to operate in the 2-2 light emitting mode, and control the speaker 160 to output the 2-2 voice guide.

Meanwhile, before detecting that an object exists within the first distance from the predetermined area R, the controller 180 may detect whether a user (or an object) exists within the third distance (e.g., 60 cm) bigger than the first distance and the second distance from the predetermined area R. Here, if a user is detected within the third distance from the predetermined area R, the controller 180 may control the light emitting part 150 to operate in the third light emitting mode.

Meanwhile, when an object is detected outside the second distance, if it is detected that the object is located within a threshold distance (e.g., 30 cm) from the predetermined area R, the controller 180 may not open the door 11. Here, the threshold distance may mean a safety distance that should be secured for preventing collision between the door 11 and the user.

In addition, the controller 180 may acquire a user's voice command for opening the door 11 through the inputter 110. Here, the controller 180 may identify whether the user exists within a predetermined distance range by using the object detection part 140. If it is identified that the user exists within the predetermined distance range, the controller 180 may control the motor 131 to open the door 11. In contrast, if it is not identified that the user exists within the predetermined distance range, the controller 180 may control the speaker 160 to output a guide message for guiding the user.

Meanwhile, the controller 180 may acquire a guide message to be provided to a user by using a speech recognition module stored in the storage 170. Alternatively, the controller 180 may transmit a user's voice command acquired through the communicator 120 to an external server, and receive a guide message from the external server.

The controller 180 may consist of one or a plurality of processors. Here, the one or plurality of processors may be generic-purpose processors, such as a central processing unit (CPU), an AP, a digital signal processor (DSP), or the like, graphics-dedicated processors, such as a GPU and a vision processing unit (VPU), or artificial intelligence-dedicated processors, such as an NPU.

FIGS. 3A, 3B, 3C, 3D, and 3E are diagrams for illustrating a door opening operation of a refrigerator according to various embodiments of the disclosure.

Figure 3A:
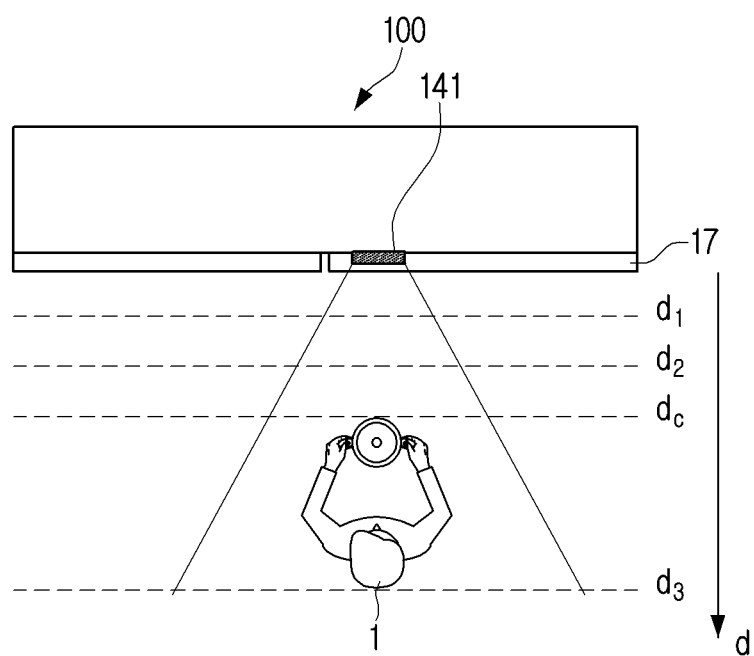
FIG. 3A is a diagram for illustrating a door opening operation of a refrigerator according to an embodiment of the disclosure.
Figure 3B:
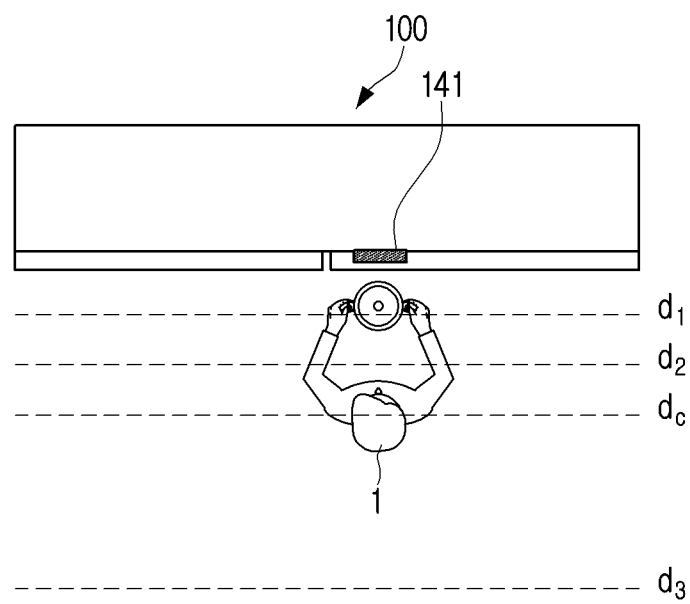
FIG. 3B is a diagram for illustrating a door opening operation of a refrigerator according to an embodiment of the disclosure.
Figure 3C:
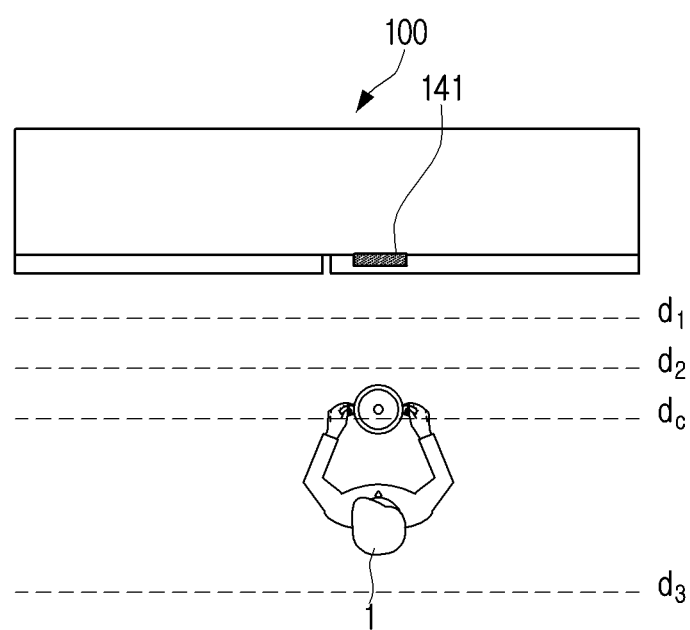
FIG. 3C is a diagram for illustrating a door opening operation of a refrigerator according to an embodiment of the disclosure.
Figure 3D:
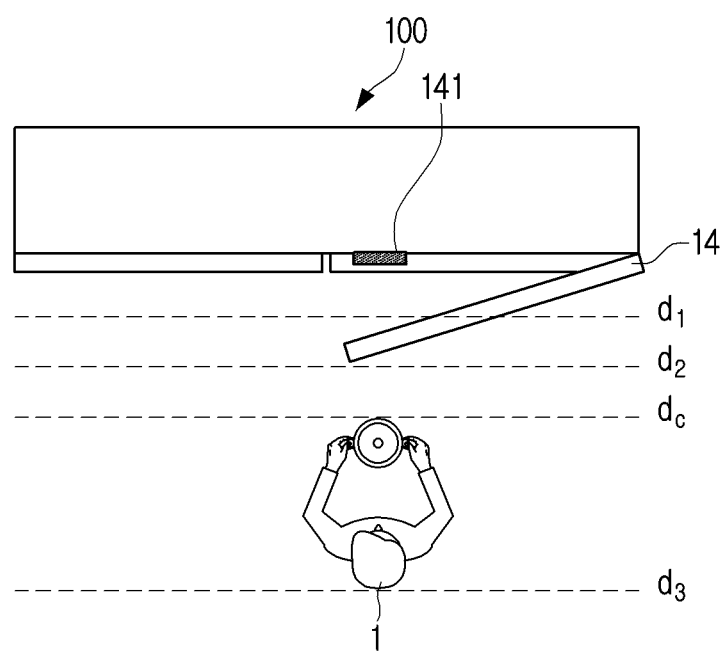
FIG. 3D is a diagram for illustrating a door opening operation of a refrigerator according to an embodiment of the disclosure.
Figure 3E:
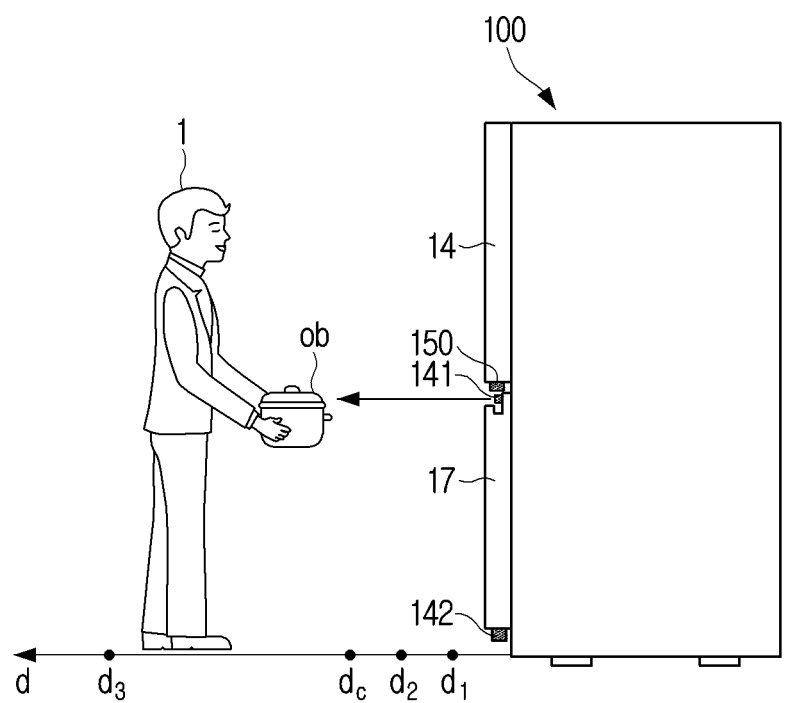
FIG. 3E is a diagram for illustrating a door opening operation of a refrigerator according to an embodiment of the disclosure.

Specifically, FIGS. 3A, 3B, 3C, and 3D are diagrams illustrating a view of the refrigerator when viewed from the top surface, and FIG. 3E is a diagram illustrating a view of the refrigerator when viewed from the side surface.

The refrigerator 100 may open the door 11 based on a distance d between the refrigerator 100 and a user.

Referring to FIGS. 3A, 3B, 3C, and 3D, the refrigerator 100 may detect a user 1 by using the first sensor 141. If the user 1 is detected within the third distance $d_3$, the refrigerator 100 may control the light emitting part 150 to operate in the third light emitting mode (e.g., light on).

In this state, the user 1 may approach the first sensor 141 closely as in FIG. 3B. Here, the refrigerator 100 may detect whether the user 1 exists within the first distance $d_1$. Specifically, the refrigerator 100 may identify whether the user 1 is continuously detected within the first distance $d_1$ during a threshold time range (e.g., two seconds). If the user 1 is detected during the threshold time range, the refrigerator 100 may output a first guide light (e.g., a flickering light). Here, the refrigerator 100 may output the first voice guide while outputting the first guide light.

In this state, the user 1 may get far from the first sensor 141 as in FIG. 3C. Here, the refrigerator 100 may identify whether the user 1 is detected outside the second distance $d_2$. Specifically, the refrigerator 100 may identify whether the user 1 is detected outside the second distance $d_2$ within a predetermined time (e.g., three seconds) from the time point when the user 1 is not detected within the first distance $d_1$ any longer after being detected within the first distance $d_1$. If the user 1 is detected outside the second distance $d_2$ within the predetermined time, the refrigerator 100 may output a second guide light (e.g., a light of which flickering speed increases). Here, the refrigerator 100 may output the second voice guide (e.g., "I'll open the refrigerating chamber door") while outputting the second guide light. Then, the refrigerator 100 may open the second refrigerating chamber door 14.

Meanwhile, the refrigerator 100 may open the second refrigerating chamber door 14 in consideration of safety of the user 1. As an example, if it is determined that there is a possibility of collision between the second refrigerating chamber door 14 and the user 1 while the second refrigerating chamber door 14 is being opened, the refrigerator 100 may control the motor 131 so that opening of the second refrigerating chamber door 14 is stopped. Specifically, if the user 1 is detected within a threshold distance $d_c$ while the second refrigerating chamber door 14 is being opened, the refrigerator 100 may stop opening of the second refrigerating chamber door 14. Here, the refrigerator 100 may output a voice guide for notifying that opening of the second refrigerating chamber door 14 is stopped, and output a guide light. Accordingly, the user's safety can be improved. Here, the threshold distance $d_c$ is a distance set for preventing collision between the door 11 and the user 1, and it may be, for example, 30 cm.

In addition, the refrigerator 100 may determine whether to open the second refrigerating chamber door 14 in consideration of whether the user 1 is detected within the threshold distance $d_c$. For example, even if the user 1 is detected at the first distance $d_1$ during the threshold time range, and then detected outside the second distance $d_2$ within the predetermined time, if the user 1 is detected within the threshold distance $d_c$, the refrigerator 100 may not open the second refrigerating chamber door 14. Here, the refrigerator 100 may identify whether the user 1 is detected outside the threshold distance $d_c$ within the predetermined time from the time point when the user 1 was detected outside the second distance $d_2$. As in FIG. 3D, if the user 1 is detected outside the threshold distance $d_c$ within the predetermined time, the refrigerator 100 may open the second refrigerating chamber door 14.

Meanwhile, as described earlier, if the user 1 is detected at the first distance $d_1$ during the threshold time range, and then detected outside the second distance $d_2$ within the predetermined time, the refrigerator 100 may open the second refrigerating chamber door 14.

Referring to FIG. 3E, the refrigerator 100 may detect whether the user 1 (or, an object ob that the user is gripping) exists within the first distance $d_1$ and whether the user 1 (or the object ob) is located outside the second distance $d_2$ by using the first sensor 141. In addition, if the user 1 is detected within the threshold distance $d_c$, the refrigerator 100 may not open the second refrigerating chamber door 14. Here, as illustrated in FIG. 3E, the refrigerator 100 may identify whether the user 1 is detected within the threshold distance $d_c$ by using the second sensor 142. As described above, the refrigerator 100 may open the second refrigerating chamber door 14 based on the respective detection results of the first sensor 141 and the second sensor 142.

Meanwhile, in the above, explanation was made based on an example wherein the second refrigerating chamber door 14 is opened, for the convenience of explanation. However, the disclosure is not limited thereto, and a case wherein the first refrigerating chamber door 13 is opened would be clearly understood based on the matters described in FIGS. 3A to 3E. In addition, it is obvious that the refrigerator 100 can open the first refrigerating chamber door 13 and the second refrigerating chamber door 14 at the same time. Meanwhile, FIGS. 3A to 3C are illustrated while the second refrigerating chamber door 14 is omitted, for the convenience of explanation, but an opening operation of the second refrigerating chamber door 14 would be clearly understood through FIGS. 3D and 3E. In addition, the second distance $d_2$ may be smaller than the threshold distance $d_c$ for user convenience, but this is merely an embodiment, and the second distance $d_2$ may be the same as the threshold distance $d_c$. In case the second distance $d_2$ and the threshold distance $d_c$ are the same, if the user 1 is detected at the first distance $d_1$ during the threshold time range, and then detected outside the threshold distance $d_c$ within the predetermined time, the refrigerator 100 may open the second refrigerating chamber door 14.

So far, an opening operation of the refrigerating chamber door 12 was explained. Meanwhile, if the refrigerating chamber door 12 is opened, the refrigerator 100 may close the refrigerating chamber door 12 based on the location of the user 1 and the time that passed from the time point when the refrigerating chamber door 12 was opened.

Specifically, if a specific condition is satisfied, the refrigerator 100 may control the motor 131 to close the refrigerating chamber door 12. Here, a specific condition may include a case wherein a user is not detected within the third distance $d_3$ within the predetermined time from the time point when the refrigerating chamber door 12 was opened. If a specific condition is satisfied, the refrigerator 100 may output a voice guide regarding the refrigerating chamber door 12 (e.g., "I'll close the door"). In addition, the refrigerator 100 may provide a visual effect to the user 1 by using the light emitting part 150. For example, in case the light emitting part 150 includes an LED module provided inside the refrigerating chamber, the refrigerator 100 may control the LED module such that the brightness of the LED module gradually decreases before closing the refrigerating chamber door 12.

Meanwhile, if the user 1 is detected within the threshold distance $d_c$ while closing the refrigerating chamber door 12, the refrigerator 100 may stop closing of the second refrigerating chamber door 14. Here, the refrigerator 100 may control the speaker 160 to output a voice guide for notifying that closing of the second refrigerating chamber door 14 is stopped, and output a guide light.

So far, an operation of opening and closing the refrigerating chamber door 12 based on a user's location detected by the object detection part 140 was explained.

Meanwhile, the refrigerator 100 may open and close the refrigerating chamber door 12 based on a user's voice command Hereinafter, an operation of opening the refrigerating chamber door 12 based on a user's voice command will be described with reference to FIGS. 4A to 4C.

Figure 4A:
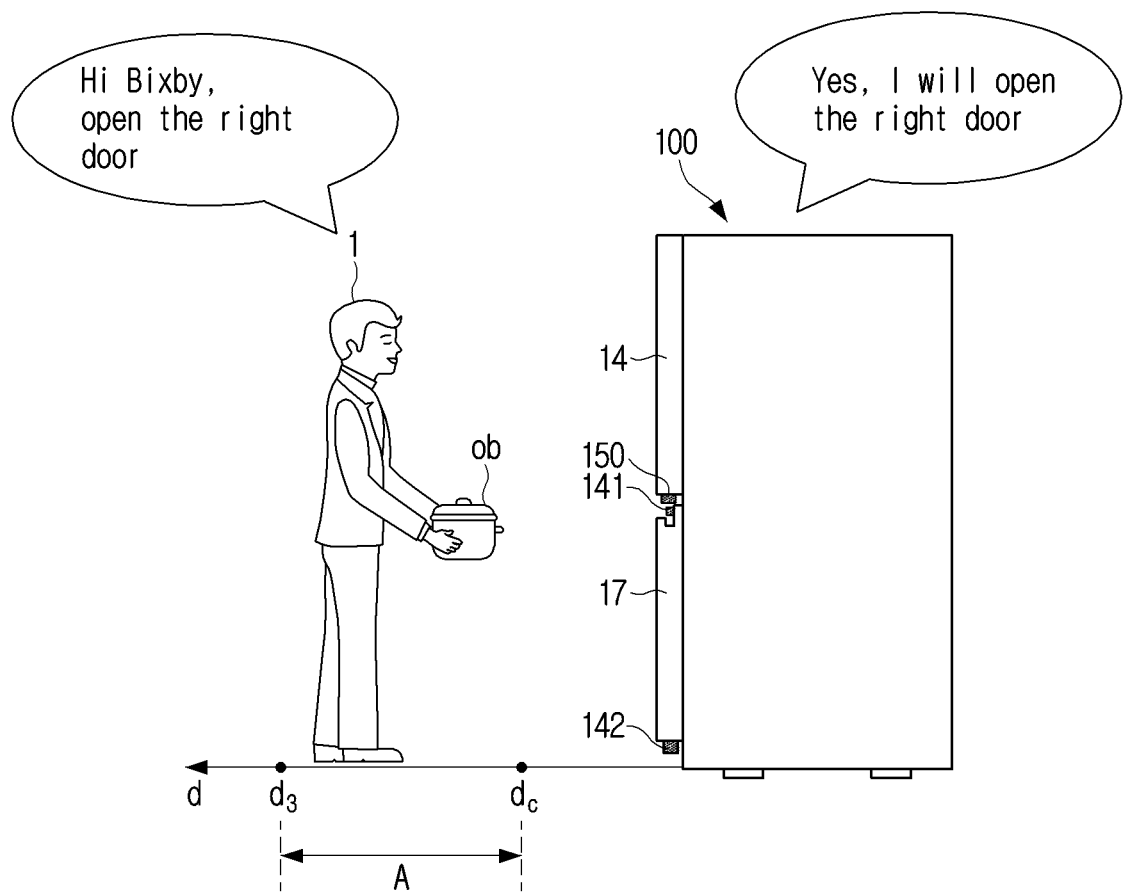
FIG. 4A is a diagram for illustrating an operation of a refrigerator opening a door based on a voice command according to an embodiment of the disclosure.
Figure 4B:
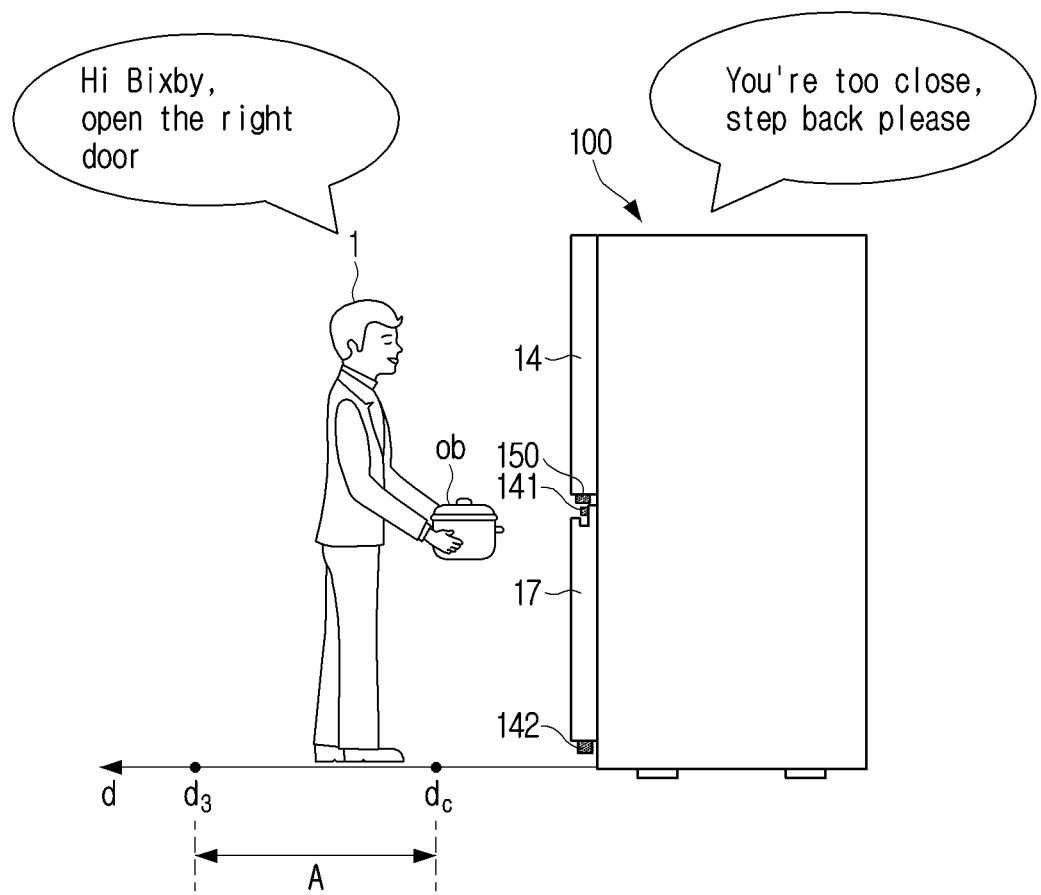
FIG. 4B is a diagram for illustrating an operation of a refrigerator opening a door based on a voice command according to an embodiment of the disclosure.
Figure 4C:
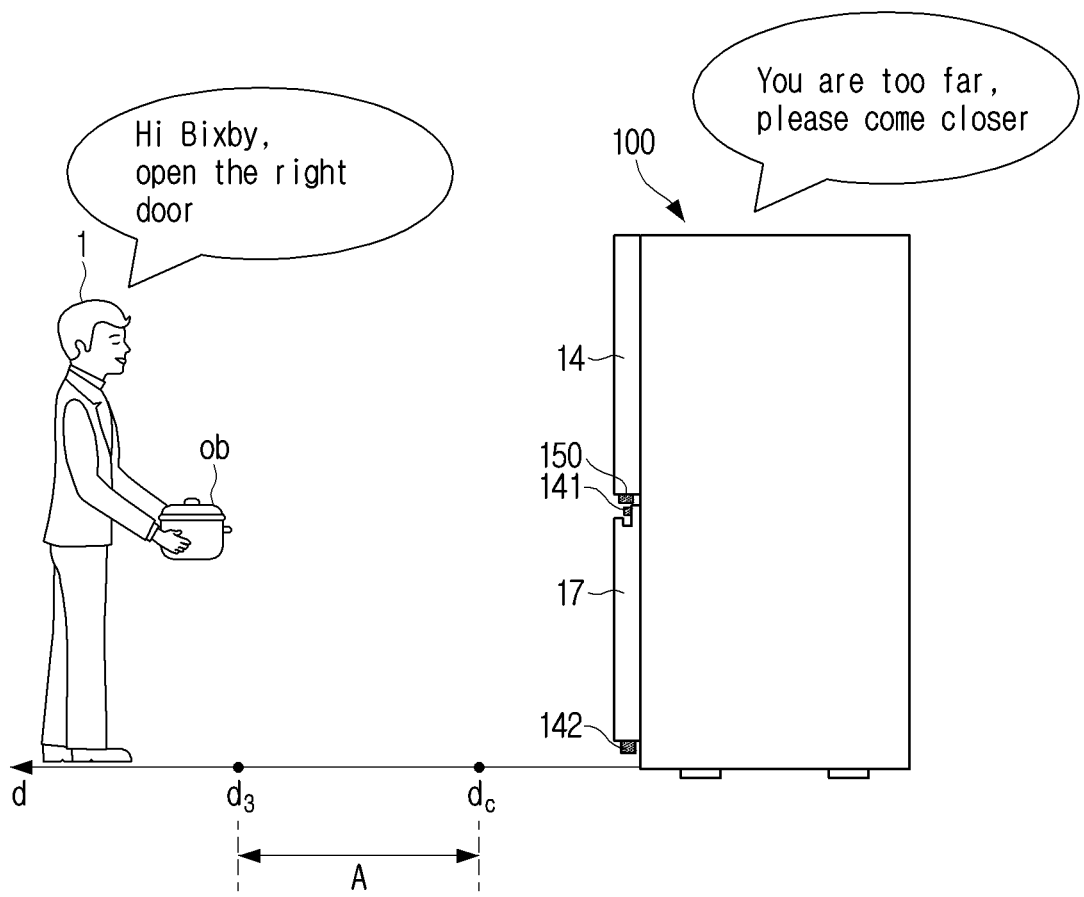
FIG. 4C is a diagram for illustrating an operation of a refrigerator opening a door based on a voice command according to an embodiment of the disclosure.

FIGS. 4A, 4B, and 4C are diagrams for illustrating an operation of a refrigerator opening a door based on a voice command according to various embodiments of the disclosure.

Referring to FIGS. 4A, 4B, and 4C, the refrigerator 100 may acquire a voice command ("Hi Bixby, open the right door") from the user 1. When the voice command of the user 1 is acquired, the refrigerator 100 may identify whether the user 1 is located within a predetermined distance range A by using the first sensor 141 and the second sensor 142. Here, the predetermined distance range A may mean the distance between the threshold distance $d_c$ and the third distance $d_3$. If it is identified that the user 1 is located within the predetermined distance range A, the refrigerator 100 may open the second refrigerating chamber door 14. Here, the refrigerator 100 may output a voice guide for notifying opening of the second refrigerating chamber door 14 ("Yes, I will open the right door") before opening the second refrigerating chamber door 14. As described above, the refrigerator 100 may open the second refrigerating chamber door 14 in response to a voice command of the user 1 only when the user 1 is detected within the predetermined distance range A.

Meanwhile, if it is not identified that the user 1 is located within the predetermined distance range A, the refrigerator 100 may output a guide message for guiding the user 1. For example, as in FIG. 4B, in case the user 1 is detected within the threshold distance $d_c$, the refrigerator 100 may output a voice guide ("You're too close, step back please"). Accordingly, the user 1 may back off from the refrigerator 100 and move within the predetermined distance range A. Alternatively, as in FIG. 4C, in case the user 1 is detected outside the third distance $d_3$, the refrigerator 100 may output a voice guide ("You are too far, please come closer"). Accordingly, the user 1 may move toward the refrigerator 100 and move within the predetermined distance range A.

Meanwhile, if the user 1 is detected within the predetermined distance range A within a predetermined time after outputting a voice guide, the refrigerator 100 may open the second refrigerating chamber door 14. In contrast, if the user 1 is not detected within the predetermined distance range A within the predetermined time, the refrigerator 100 may output an additional voice guide notifying canceling of a door opening operation (e.g., "I will cancel the door opening").

So far, an operation of the refrigerator 100 of controlling the door 11 in response to the user 1 for opening the door 11 was explained.

Meanwhile, the refrigerator 100 may control the door 11 based on a command of a user 1 for closing the door 11. The refrigerator 100 may acquire a voice command ("Hi Bixby, close the right door") from the user 1. When a voice command of the user 1 is acquired, the refrigerator 100 may identify whether the user 1 is located within the predetermined distance range A by using the first sensor 141 and the second sensor 142. If it is identified that the user 1 is located within the predetermined distance range A, the refrigerator 100 may close the second refrigerating chamber door 14. Here, the refrigerator 100 may output a voice guide for notifying that the second refrigerating chamber door 14 is closed ("Yes, I will close the right door") before closing the second refrigerating chamber door 14. As described above, the refrigerator 100 may close the second refrigerating chamber door 14 in response to a voice command of the user 1 only when the user 1 is detected within the predetermined distance range A.

Figure 5:
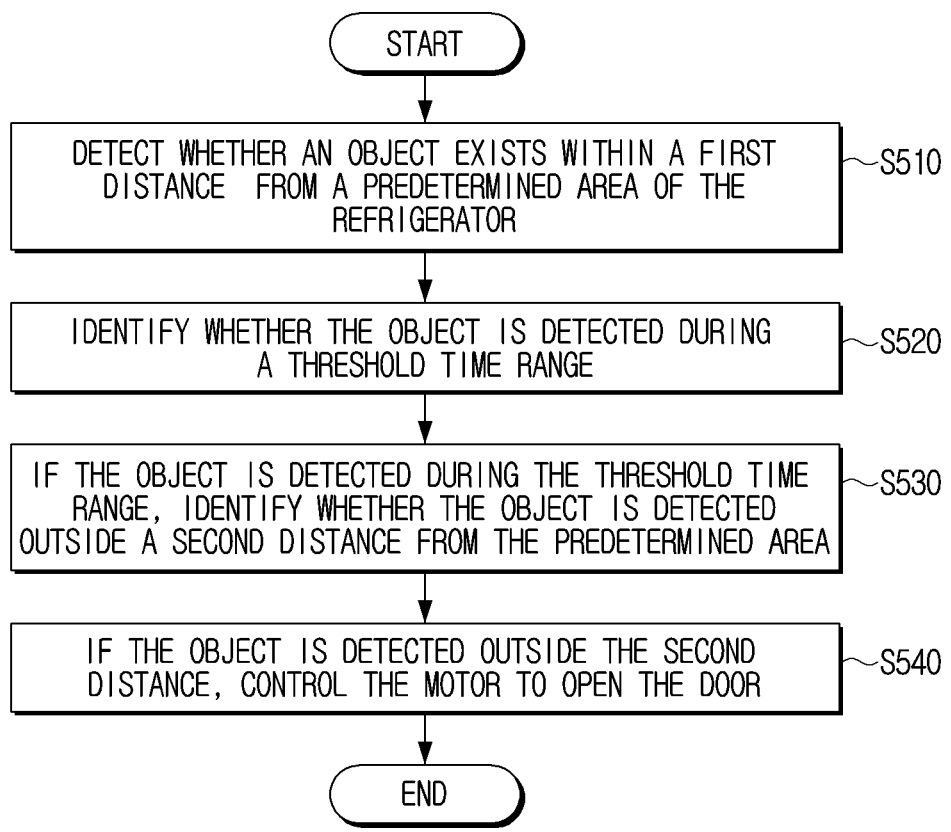
FIG. 5 is a flowchart for illustrating a controlling method of a refrigerator according to an embodiment of the disclosure.

FIG. 5 is a flowchart for illustrating a controlling method of a refrigerator according to an embodiment of the disclosure.

Referring to FIG. 5, the refrigerator 100 may detect whether an object exists within a first distance from a predetermined area of the refrigerator in operation S510, identify whether the object is detected during a threshold time range in operation S520, based on identifying that the object is detected during the threshold time range, identify whether the object is detected outside a second distance from the predetermined area in operation S530, and based on the object being detected outside the second distance, control the motor to open the door in operation S540. Hereinafter, the respective operations will be explained. Meanwhile, parts that overlap with the contents described in FIGS. 3A to 3E will be omitted for the convenience of explanation.

The refrigerator 100 may detect whether an object exists within a first distance from a predetermined area of the refrigerator in operation S510. Here, as illustrated in FIG. 3B, the refrigerator 100 may detect whether the user 1 or an object that the user 1 is gripping exists within the first distance $d_1$ from the refrigerator 100 by using the first sensor 141. Here, the predetermined area may be the upper area of the lower door of the refrigerator 100, and it may mean an area wherein the first sensor 141 is located in FIG. 3E.

The refrigerator 100 may identify whether the object is detected during a threshold time range in operation S520. Here, the refrigerator 100 may identify whether the object is continuously detected within the first distance $d_1$ during the threshold time range in operation S520.

If the object is detected during the threshold time range, the refrigerator 100 may identify whether the object is detected outside a second distance from the predetermined area in operation S530. Here, the refrigerator 100 may identify whether the object is detected outside the second distance $d_2$ within a predetermined time from the time point when the object is not detected within the first distance $d_1$ any longer after being detected within the first distance $d_1$.

If the object is detected outside the second distance $d_2$, the refrigerator 100 may control the motor to open the door in operation S540. Here, the refrigerator 100 may open the door 11 if the object is detected outside the second distance $d_2$ within a predetermined time from the time point when the object is not detected within the first distance $d_1$ any longer after being detected within the first distance $d_1$.

Figure 6:
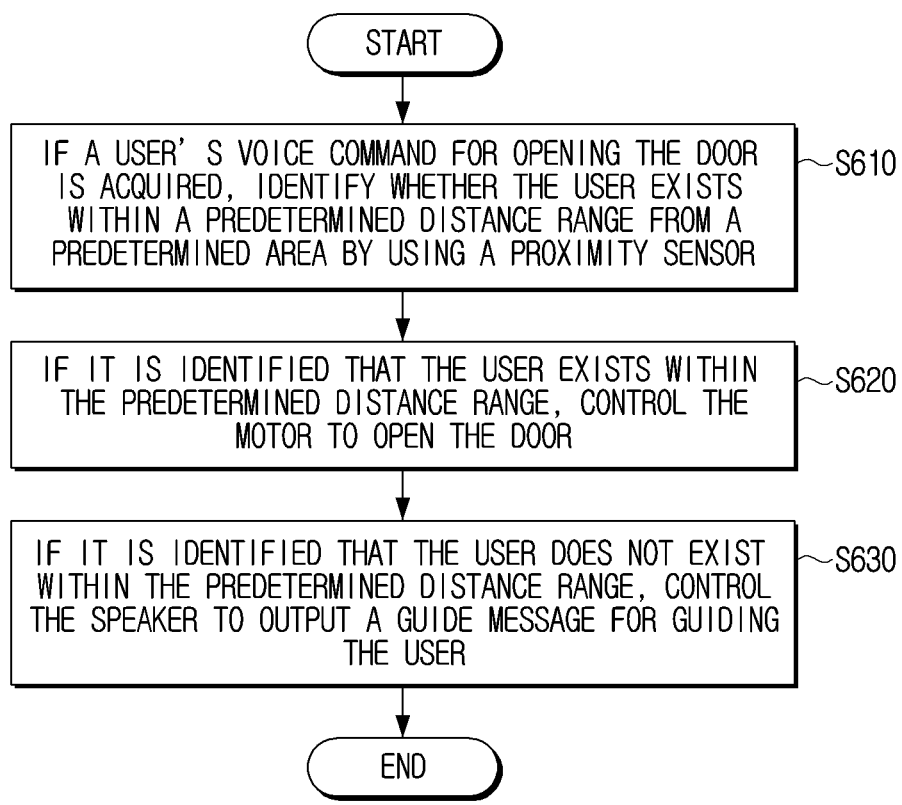
FIG. 6 is a flowchart for illustrating a controlling method of a refrigerator according to another embodiment of the disclosure.

FIG. 6 is a flowchart for illustrating a controlling method of a refrigerator according to an embodiment of the disclosure.

Referring to FIG. 6, if a user's voice command for opening the door is acquired, the refrigerator 100 may identify whether the user exists within a predetermined distance range from a predetermined area by using a proximity sensor in operation S610, and if it is identified that the user exists within the predetermined distance range, control the motor to open the door in operation S620, and if it is identified that the user does not exist within the predetermined distance range, control the speaker to output a guide message for guiding the user in operation S630. Hereinafter, the respective operations will be explained. Meanwhile, parts that overlap with the contents described in FIGS. 4A to 4C will be omitted for the convenience of explanation.

If a user's voice command for opening the door is acquired, the refrigerator 100 may identify whether the user exists within a predetermined distance range from a predetermined area by using a proximity sensor in operation S610. Here, the refrigerator 100 may identify whether the user exists within the predetermined distance range A by using the first sensor 141 and the second sensor 142.

If it is identified that the user exists within the predetermined distance range, the refrigerator 100 may control the motor to open the door in operation S620. Here, the refrigerator 100 may output a voice message notifying opening of the door 11 when opening the door 11. In addition, if it is detected that an object exists within a threshold distance $d_c$ through the first sensor 141 and the second sensor 142 while opening the door 11, the refrigerator 100 may stop opening of the door 11, and output a voice message notifying stopping of opening of the door 11.

If it is identified that the user does not exist within the predetermined distance range, the refrigerator 100 may control the speaker to output a guide message for guiding the user in operation S630. Here, the refrigerator 100 may output a voice guide for guiding the user within the predetermined distance range, or output a guide light.

FIG. 7 is a sequence diagram of a refrigerator control system according to an embodiment of the disclosure.

Referring to FIG. 7, the refrigerator control system 300 may include a refrigerator 100 and an external device 200. For example, the external device 200 may include a user terminal device that can communicate with the refrigerator 100, a personal computer (PC), or the like.

The external device 200 may acquire a user command in operation S710. In addition, the external device 200 may display an execution screen of an application for acquiring a user command Here, on the execution screen of the application, a plurality of UI elements for controlling the refrigerator 100 may be displayed. The external device 200 may acquire a user command for inputting UI elements. For example, the external device 200 may acquire a user's touch input for opening the door 11. Alternatively, the external device 200 may acquire a user command for activating or inactivating the door opening device 130. However, this is merely an embodiment, and the external device 200 may acquire a user's voice command or gesture command.

The external device 200 may acquire a door control signal based on the acquired user command in operation S720. For example, if a user command for opening the door 11 is acquired, the external device 200 may generate a control signal for opening the door 11. Then, the external device 200 may transmit the acquired door control signal to the refrigerator 100 in operation S730. Here, the external device 200 may transmit the door control signal to the refrigerator 100 through various communication means (e.g., Wi-Fi).

The refrigerator 100 may receive the door control signal from the external device 200, and control the door based on the received door control signal in operation S740. For example, the refrigerator 100 may open the door 11. Then, the refrigerator 100 may identify door state information in operation S750. For example, the refrigerator 100 may identify the opening state (e.g., the opening angle, the opening speed, or the like) of the door 11. The refrigerator 100 may transmit the identified door state information to the external device 200 in operation S760.

The external device 200 may receive the door state information from the refrigerator 100, and provide the received door state information in operation S770. For example, the external device 200 may display the opening state of the door 11.

Meanwhile, the aforementioned various embodiments of the disclosure may be implemented in a recording medium that can be read by a computer or a device similar to a computer by using software, hardware or a combination thereof. In some cases, the embodiments described in this specification may be implemented as the processor itself. According to implementation by software, the embodiments, such as procedures and functions described in this specification may be implemented as separate software modules. The software modules may respectively perform one or more functions and operations described in this specification.

Meanwhile, computer instructions for performing processing operations according to the aforementioned various embodiments may be stored in a non-transitory computer-readable medium. Computer instructions stored in such a non-transitory computer-readable medium make the processing operations according to the aforementioned various embodiments performed by a specific machine, when the instructions are executed by the processor.

A non-transitory computer-readable medium refers to a medium that stores data semi-permanently, and is readable by machines, but not a medium that stores data for a short moment, such as a register, a cache, and a memory. As specific examples of a non-transitory computer-readable medium, there may be a compact disc (CD), a digital versatile disc (DVD), a hard disc, a blue-ray disc, a universal serial bus (USB), a memory card, a read-only memory (ROM), and the like.

Meanwhile, a storage medium that is readable by machines may be provided in the form of a non-transitory storage medium. Here, the term 'a non-transitory storage medium' only means that the device is a tangible device, and does not include a signal (e.g., an electronic wave), and the term does not distinguish a case wherein data is stored semi-permanently in a storage medium and a case wherein data is stored temporarily. For example, 'a non-transitory storage medium' may include a buffer wherein data is temporarily stored.

According to an embodiment of the disclosure, a method according to the aforementioned various embodiments may be provided while being included in a computer program product. The computer program product can be traded between a seller and a purchaser as a commodity. The computer program product may be distributed in the form of a machine-readable storage medium (e.g., a compact disc read only memory (CD-ROM)), or may be distributed directly between two user devices (e.g., smartphones), and distributed on-line (e.g., download or upload) through an application store (e.g., Playstore™). In the case of online distribution, at least a portion of the computer program product (e.g., a downloadable app) may be at least temporarily stored in a storage medium, such as a server of a manufacturer, a server of an application store, or a memory of a relay server, or temporarily generated.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A refrigerator comprising:
a main body including a door;
a door opener including a motor, and for opening the door using the motor;
a proximity sensor;
a light emitter;
a speaker; and
at least one processor,
wherein the at least one processor is configured to:
  detect whether an object exists within a first distance from a predetermined area of the refrigerator,
  when the object exists within the first distance from the predetermined area of the refrigerator, identify whether the object is detected during a threshold time range,
  in response to the object being detected during the threshold time range, output, via the speaker, a voice guide guiding to move the object away from the refrigerator,
  identify whether the object is detected outside a second distance from the predetermined area,
  in response to the object being detected outside the second distance, control the motor to open the door,
  while the door is being opened, identify whether the object is located within a third distance from the predetermined area, the third distance being outside the second distance but within a collision distance of the door,
  in response to the object being detected outside the second distance but inside the third distance, stop the opening of the door,
  identify whether the object is located within the third distance from the predetermined area,
  in response to the object being detected outside the third distance, control the motor to close the door,
  while the door is being closed, identify whether the object is located within the collision distance of the door,
  in response to the object being detected within the collision distance, stop closing of the door,
  output guide information guiding to move the object away from the refrigerator by controlling the light emitter to operate in a first light emitting mode, and
  based on the object being detected outside the second distance, control the light emitter to operate in a second light emitting mode different from the first light emitting mode.

2. The refrigerator of claim 1, wherein the at least one processor is further configured to:
identify whether the object is detected outside the second distance within a predetermined time from a time point when the object is not detected within the first distance any longer after being detected within the first distance, and
based on the object being detected outside the second distance within the predetermined time, control the motor to open the door.

3. The refrigerator of claim 1, wherein the predetermined area includes an upper area of a lower door of the refrigerator.

4. The refrigerator of claim 1, wherein the at least one processor is further configured to:
based on the object not being detected during the threshold time range within the first distance, control the light emitter to operate in a third light emitting mode.

5. The refrigerator of claim 1, wherein the proximity sensor comprises:
a first sensor configured to detect whether the object exists within the first distance and whether the object is located outside the second distance from the predetermined area; and
a second sensor configured to detect whether the object exists within a threshold distance.

6. The refrigerator of claim 5,
wherein the first sensor is arranged in an upper part of a second door, and
wherein the second sensor is arranged in a lower part of the second door.

7. The refrigerator of claim 1, further comprising:
a microphone for receiving a voice command of a user,
wherein the at least one processor is further configured to:
  based on acquiring the voice command of the user for opening the door, identify whether the user exists within a predetermined distance range from the predetermined area by using the proximity sensor,
  based on identifying that the user exists within the predetermined distance range, control the motor to open the door,
  based on identifying that the user does not exist within the predetermined distance range, control the speaker to output a guide message for guiding the user to move within the predetermined distance range,
  while the door is being opened, identify whether the user is located within the second distance from the predetermined area, the second distance being inside the predetermined distance range and within the collision distance of the door, and in response to the user being detected inside the second distance, stop the opening of the door.

8. A controlling method of a refrigerator comprising a main body including a door, a door opener including a motor for opening the door using the motor, a proximity sensor, a speaker, a light emitter, and at least one processor, the method comprising:
- detecting whether an object exists within a first distance from a predetermined area of the refrigerator;
- when the object exists within the first distance from the predetermined area of the refrigerator, identifying whether the object is detected during a threshold time range;
- in response to the object being detected during the threshold time range, outputting, via the speaker, a voice guide guiding to move the object away from the refrigerator;
- identifying whether the object is detected outside a second distance from the predetermined area;
- in response to the object being detected outside the second distance, controlling the motor to open the door;
- while the door is being opened, identifying whether the object is located within a third distance from the predetermined area, the third distance being outside the second distance but within a collision distance of the door;
- in response to the object being detected outside the second distance but inside the third distance, stopping the opening of the door;
- identifying whether the object is located within the third distance from the predetermined area;
- in response to the object being detected outside the third distance, controlling the motor to close the door;
- while the door is being closed, identifying whether the object is located within the collision distance of the door;
- in response to the object being detected within the collision distance, stopping closing of the door;
- outputting guide information guiding to move the object away from the refrigerator by controlling the light emitter to operate in a first light emitting mode; and
- based on the object being detected outside the second distance, controlling the light emitter to operate in a second light emitting mode different from the first light emitting mode.

9. The method of claim 8,
wherein the identifying of whether the object is detected outside the second distance comprises:
- identifying whether the object is detected outside the second distance within a predetermined time from a time point when the object is not detected within the first distance any longer after being detected within the first distance, and wherein the controlling of the motor comprises:
- based on the object being detected outside the second distance within the predetermined time, controlling the motor to open the door.

10. The method of claim 8, wherein the predetermined area includes an upper area of a lower door of the refrigerator.

11. The method of claim 8, further comprising:
- based on the object not being detected during the threshold time range within the first distance, controlling the light emitter to operate in a third light emitting mode.

12. The method of claim 8, wherein the proximity sensor comprises:
- a first sensor configured to detect whether the object exists within the first distance and whether the object is located outside the second distance; and
- a second sensor configured to detect whether the object exists within a threshold distance from the predetermined area.

13. The method of claim 12,
wherein the first sensor is arranged in an upper part of a second door, and
wherein the second sensor is arranged in a lower part of the second door.

14. The method of claim 8, further comprising:
- based on acquiring the voice command of a user for opening the door, identifying whether the user exists within a predetermined distance range from the predetermined area by using the proximity sensor;
- based on identifying that the user exists within the predetermined distance range, controlling the motor to open the door;
- based on identifying that the user does not exist within the predetermined distance range, controlling the speaker to output a guide message for guiding the user to move within the predetermined distance range;
- while the door is being opened, identifying whether the user is located within the second distance from the predetermined area, the second distance being inside the predetermined distance range and within the collision distance of the door; and
- in response to the user being detected inside the second distance, stopping the opening of the door.

* * * * *